United States Patent [19]

Hasselman, Jr.

[11] 4,239,881

[45] Dec. 16, 1980

[54] PHENAL-UREA-FORMALDEHYDE CONDENSATION PRODUCT

[75] Inventor: Walter Hasselman, Jr., Scarsdale, N.Y.

[73] Assignee: C.P. Chemical Company, Inc., White Plains, N.Y.

[21] Appl. No.: 973,683

[22] Filed: Dec. 27, 1978

Related U.S. Application Data

[63] Continuation of Ser. No. 497,738, Aug. 15, 1974, abandoned.

[51] Int. Cl.$^3$ .............................................. C08J 9/30
[52] U.S. Cl. .................... 528/164; 521/135; 521/181; 521/188; 528/144
[58] Field of Search ................ 521/181; 528/164, 144

[56] References Cited

U.S. PATENT DOCUMENTS

| | | | |
|---|---|---|---|
| 1,678,024 | 7/1928 | Terwilliger | 260/51.5 |
| 1,779,551 | 10/1930 | Lougovay | 260/51.5 |
| 1,973,050 | 9/1934 | Crump | 260/51.5 |
| 2,205,427 | 6/1940 | Loos | 260/51.5 |
| 2,315,087 | 3/1943 | Curvier | 260/51.5 |
| 2,616,866 | 11/1952 | Juda | 260/51.5 |
| 3,077,458 | 2/1963 | Quelle et al. | 260/2.5 F |
| 3,164,559 | 1/1965 | Eberl | 260/2.5 F |
| 3,522,196 | 7/1970 | Dorier et al. | 260/2.5 F |
| 3,547,868 | 12/1970 | Schwartzenburger et al. | 260/51.5 |
| 3,869,387 | 3/1975 | Vorgui et al. | 260/51.5 |
| 3,915,905 | 10/1975 | Hanton | 260/2.5 F |

FOREIGN PATENT DOCUMENTS 256711  8/1926  United Kingdom .................... 260/51.5

*Primary Examiner*—Morton Foelak
*Attorney, Agent, or Firm*—Pennie & Edmonds

[57] ABSTRACT

This invention relates to cellular plastic compositions of condensation products of phenol-urea and formaldehyde useful for thermal and acoustical insulation and methods for their preparation in which the phenol is present in amounts of about 1 to about 20 percent by weight wherein the condensation product prior to foaming and setting as a rigid cellular plastic has a viscosity at room temperature of approximately 30 to 36 seconds, No. 1 Zahn cup, and a pH maintained in the range of about 6 to 8.

3 Claims, No Drawings

PHENAL-UREA-FORMALDEHYDE CONDENSATION PRODUCT

This is a continuation of application Ser. No. 497,738 filed Aug. 15, 1974 now abandoned.

BACKGROUND OF THE INVENTION (1) Field of the Invention

This invention is directed to condensation products and methods for the preparation of condensation products of phenol, urea, and formaldehyde which provide cellular plastic compositions useful as insulation material.

(2) Description of the Prior Art

Heretofore, foamed materials derived from condensates of a phenol and formaldehyde have been prepared by mixing a liquid phenol-formaldehyde resin, a blowing agent, optionally a surfactant, and then a curing (i.e., hardening) agent, such as a strong acid, and applying heat to volatilise the blowing agent and harden the resin.

Such compositions and the methods of their preparation posed obvious disadvantages, particularly if large sections of rigid, foamed condensates were required. Big ovens or a large number of infra-red heaters were required to supply heat evenly over the whole surface. Since the foams possessed good heat-insulating properties, it was very difficult to supply heat to the interior of a large block of the foamed condensate. Irregular heating resulted in a non-uniform foam which was unsuitable for the purpose for which it was intended and which was structurally weak. Since external heaters or ovens are required to obtain a satisfactory rate of hardening, ("on-site") preparation of foams was difficult, or even impossible, and this was a further disadvantage of such compositions and methods.

In attempts to overcome these drawbacks, other substances have been included in the resin mixture which react exothermically with the curing agent and thus reduce or remove the need for applying heat to cure the resin. Solid substances which have been so used include phosphorus pentoxide, barium oxide, and calcium carbonate. However, such exothermically-reacting substances are sometimes unpleasant to handle on an industrial scale, the foams contain inert materials which add to the weight of the product, but serve no useful purpose, and since the unfoamed starting mixtures contain solids, it is difficult to obtain uniform suspensions, which will give uniform foams. This is especially true if a continuous method of foaming is employed. Alternatively, as shwon by U.S. Pat. No. 3,692,706, liquids have been added which react exothermically to form a polymer under the influence of the curing agent. However, even the use of this expedient does not solve the major drawback of all these systems which is that they all require a chemical blowing agent. In other words, the phenol-formaldehyde resins cannot be foamed, placed, and set by simple mechanical agitation and pumping.

While insulation materials based on condensates of urea and formaldehyde have been foamed, placed and set by simple mechanical agitation and pumping, such materials have unsatisfactory to poor chemcial and physical properties for many thermal and acoustical insulation uses for which such condensates are intended. For example, such condensates have poor compressive strength, tensile strength, shear strength, and their water solubility is too high for many insulation uses for which they are intended in the building industry. In addition, their flame spread characteristic is higher than desirable for many applications in the building industry where safety is an important feature.

Mixtures of phenol-formaldehyde and urea-formaldehyde condensates and certain urea-phenol-formaldehyde condensates are known in the art, see U.S. Pat. Nos. 3,077,458 and 3,549,473, but these materials have characteristics restricting their use to liquid films or binders.

SUMMARY OF THE INVENTION

It has now been found that an excellent thermal and acoustical insulation material having vastly superior tensile strength, shear strength, compressive strength, and water repellency, and much lower fuel contribution, and flame spread compared to prior art compositions can be obtained by preparing a phenol-urea-formaldehyde resin in which the phenol content of the resin varies from about 1 to about 20 percent by weight of the total resin content and which is maintained at a pH of about 6 to about 8 after the suitable degrees of reaction have been accomplished.

Thus, the present invention provides condensation products and methods for the preparation of condensation products of phenol-urea and formaldehyde which form foamed cellular compositions where, in the condensation product, the phenol is present in the amounts of from about 1 to about 20 percent by weight, the urea is present in the amount of from about 23 to about 48 percent by weight, and the formaldehyde is present in the amount of from about 42 to 70 percent by weight, the ratio of formaldehyde to urea being in the range of from about 1 to about 3 parts formaldehyde to about 1 part urea, said condensation product having a viscosity at room temperature in the range of about 30 to 36 seconds on a No. 1 Zahn cup prior to the commencement of setting and a pH maintained in the range of from about 6 to about 8 prior to the commencement of setting.

DESCRIPTION OF THE INVENTION

The following indicates how typical compositions according to the invention may be produced.

Generally, an aqueous solution of uninhibited formaldehyde is first charged into a suitable vessel containing an agitator, a closed hot water system, and a cooling condenser. This is preheated to temperatures in the range of about 15° to 80° C. preferably about 30° C. and the pH is adjusted with a basic or caustic solution, such as sodium hydroxide, to about 7. Alternatively, the compositions of this invention may be produced by starting with an aqueous solution of urea-formaldehyde reaction products commercially available under the trade name "U.F. Concentrate-85". "U.F. Concentrate-85" is a clear, colorless, viscous liquid composed of formaldehyde, urea, and a small amount of water which is believed to be a mixture of methylolureas and formaldehyde. It contains about 15% water and approximately 85% solids, the latter combined in a formaldehyde to urea mol ratio of about 4.8 to 1. The "U.F. Concentrate-85" is charged into a suitable vessel containing an agitator, a closed hot water system, and a cooling condenser. This is diluted on an approximately 1:1 basis by weight with water and then preheated to temperatures in the range of about 15° to 80° C., preferably about 30° C., and the pH adjusted with a basic or castic solution to about 7.

Thereafter, the appropriate parts by weight of phenol are added in amounts necessary to achieve the desired weight percent of phenol in the end product and the pH is again adjusted with the base to maintain it at about 7. The urea or additional urea to be incorporated in the final product is added and the mixture is agitated to dissolve the urea, usually from about 10 minutes to about an hour, depending on the amount of urea added, at ambient temperature, i.e., about 30° C. Then the mixture is heated and reacted under constant agitation at reflux (98° C. to 100° C.) for approximately 15 minutes up to about an hour. At the end of this period and maintaining this temperature, an aqueous formic acid solution containing up to as much as about 20 percent formic acid (HCOOH) is added slowly over a period of time, usually 45 minutes, until the desired amount of formic acid is present in the reacting mixture, and until the reaction mixture is brought down to a pH of between 6 and 4.4, preferably about 5.5. While maintaining a temperature of approximately 100° C. and constant agitation, viscosities are taken at intervals of 5 minutes. When the viscosity reaches approximately 30 seconds on a No. 1 Zahn cup, the reaction may be concluded as described hereinafter, depending on the product characteristics desired.

However, should a condensation product of higher viscosity be desired, the following simple test of water solubility is helpful as a preliminary quick indication of viscosity. A small quantity, such as ↓ 0.25 cc., is taken [by pipette] from the reaction mixture at intervals of 2 minutes and dropped into a beaker of distilled water at a temperature of 15° C. When droplets of the reaction mixture are observed to form a slight white cloud, the viscosity should be about 31.5 to 32 seconds on the No. 1 Zahn cup. Should a still higher viscosity be desired, a 10 cc. sample of the reaction mixture can be taken at intervals of about 2 minutes. When mixing this sample with 40 cc. of distilled water at 15° C. yields a dense white cloud, the viscosity should be about 32.5 seconds. If the reaction is continued the condensate will become more viscous yielding even more opaque mixtures. More elaborate measurement techniques are also available, involving measurement of ohmic resistance/electrical conductivity or index of refraction.

The final viscosity of the condensate should be in the range of about 30 to about 36 seconds on a No. 1 Zahn cup. The viscosity can go up as high as 40 seconds, but the condensate should then be cut with water to bring the viscosity down to the desired range. For most end uses a viscosity of about 32.5 seconds is optimum.

When the desired final viscosity is reached, the mixture is cooled down rapidly and neutralized with a basic or caustic solution, such as sodium hydroxide, and removed from the reaction vessel. The final pH of the reaction product should be maintained at between 6 and 8, preferably at about 7.

The phenol-urea-formaldehyde resins of this invention, having viscosities and pH values in the ranges mentioned above, have long shelf lives of from over 2 to over 6 months and can be pumped mechanically through orifices as small as 1 mm, whereupon they set up extremely rapidly, in the order of about 5 to 150 seconds, depending on viscosity and age of condensate, to provide superior stable cellular thermal and acoustical non-combustible insulation particularly suited for cavities in building wall systems, masonry, foundations, slabs, and roofs.

Conventional foaming agents, hardening agents, etc., known in the phenol-formaldehyde and urea-formaldehyde art can be used in carrying out the invention. Optionally, conventional blowing agents known in the phenol-formaldehyde and urea-formaldehyde art may be used if desired but they are not necessary for utilization of the invention described herein.

The following specific examples illustrate the preparation of a phenol-urea-formaldehyde resin according to the present invention in which the weight percent of phenol in the final raw condensation product is approximately 2 percent in Example 1 and approximately 15 percent in Example 2.

EXAMPLE 1

8.4 parts by weight of 37 percent uninhibited HCHO (formaldehyde) is charged into a suitable vessel containing an agitator of low rpm, a closed hot water system and cooling condenser, and is preheated to 30° C. The pH is normally 4.6 to 5.0. This is adjusted by means of a 1 to 4 normal NaOH solution until a pH of 6.8 to 7.0 is obtained. 0.114 parts by weight of phenol of approximately 95% solution is added to the formaldehyde solution at 30° C. The pH is again checked and adjusted to 7.0. Immediately upon this neutralization, 3 parts by weight of dry urea (industrial grade) is added to the mixture now under constant agitation. This is agitated for a period of approximately 10 minutes to dissolve the urea. At this point the mixture is heated by means of a closed hot water system capable of producing temperatures up to 120° C. or by other means of producing this temperature, for example, an ethylene glycol bath. The mixture is then heated under constant agitation to reflux (98° to 100° C.) and reacted for a period of 15 minutes. At the end of this period and maintaining this temperature, a 10% solution of HCOOH (formic acid) is slowly added over a period of 30 to 45 minutes to bring the reaction mixture down to a pH of 5.5.

While maintaining 100° C. and constant agitation, viscosities are taken at intervals of 5 minutes. When viscosity reaches approximately 30 seconds on a No. 1 Zahn cup, a small quantity, such as 0.25 cc, is taken from the reaction mixture and dropped into a beaker of distilled water at a temperature of 15° C. and is observed. This test is for water solubility and when droplets of the reaction mixture start to form a slight white cloud, the viscosity should be about 31.5 to 32 seconds on a No. 1 Zahn cup. If the viscosity exceeds this, water is added slowly as not to stop reaction, and viscosity is brought to this point. The water solubility test is then taken at intervals of 2 minutes. When the resin forms a dense white cloud, the viscosity should be about 32.5 seconds, i.e., the desired viscosity. Here 10 cc of reaction mixture is taken and mixed with 30 cc distilled water at 15° C. This solution should form a smooth, white opaque cloud mixture. If not, the reaction is continued until opaque mixture is obtained. At this point the mixture is cooled down rapidly and neutralized to a pH of 7.0 with a solution of 2 normal NaOH and removed from the reaction kettle.

EXAMPLE 2

8.4 parts by weight of 37% uninhibited HCHO (formaldehyde) is charged into a suitable vessel containing an agitator of low rpm, a closed hot water system and cooling condenser, and is preheated to 30° C. The pH is normally 4.6 to 5.0. This is adjusted by means of a 1 to 4 normal NaOH solution until a pH of 6.8 to 7.2 is obtained. 1.311 parts by weight of phenol of approximately 95% solution is added to the formaldehyde solution at 30° C. The pH is again checked and adjusted to 7.0. Immediately upon this neutralization, 3 parts by weight of dry urea (industrial grade) is added to the mixture now under constant agitation. This is agitated for a period of approximately 10 minutes to dissolve the urea. At this point the mixture is heated by means of a closed hot water system capable of producing temperatures up to 120° C. or by other means of producing this temperature, for example, an ethylene glycol bath. The mixture is then heated under constant agitation to reflux (98° to 100° C.) and reacted for a period of 15 minutes. At the end of this period and maintaining this temperature, a 10% solution of HCOOH (formic acid) is slowly added over a period of 30 to 45 minutes to bring the reaction mixture down to a pH of 5.0. The reaction is continued at 100° C. and maintaining constant agitation until an opaque mixture is obtained with the water solubility tests described in Example 1. At this point the mixture is cooled down rapidly and neutralized to a pH of 7.0 with a solution of 2 normal NaOH and removed from the reaction kettle.

The chemical and physical properties of these resins are set forth below in tabular form and compared against a commercially available urea formaldehyde resin. In both resins the same type of foaming agent, i.e., an aqueous detergent mixture expanded by air was utilized.

|  | Urea-Formaldehyde Resin | Phenol-Urea-Formaldehyde Resin | |
| --- | --- | --- | --- |
|  |  | Example 1 | Example 2 |
| Compressive Strength (lbs./in.$^2$) | 4 | 9 | 17 |
| Tensile Strength (lbs./in.$^2$) | 1 | 3.2 | 4.7 |
| Shear Strength (lbs./in.$^2$) | 2 | 5.5 | 6.3 |
| Density (lbs/ft.$^3$) | 0.6 | 0.9 | 1.6 |
| Toxicity | Non-toxic | Non-toxic | Non-toxic |
| Water Transmission (%) | 3 | 1 | <1 |
| Flame Spread | 25 | 5 | 0–5 |
| Smoke Contribution | 0 to 5 | 5 | 5 to 10 |
| Fuel Contribution | 10 | 0 | 0 |
| Water Absorbancy/ 24. Hr. (by weight) | 11½ | 3½ | 2½ |
| Heat Disintegration (complete) 3" × 3" × 2" at 3,600° F. | 50 sec. | 3 min. 29 sec. | 4 min. |

The resins of this invention containing from about 1 percent to 2.0 percent phenol by weight give exceptionally excellent results for in-place foaming such as cavity fill for thermal and acoustical insulting foam. At these percentages of phenol, the products in a foam state have greatly reduced surface burning characteristics over the normal urea formaldehyde foams.

From about 2 percent to 5 percent phenol in the final raw condensation product provides finished foam products which have much greater compressive strengths for foam in-place cavities and also greatly reduces moisture transmission over conventional urea-formaldehyde products, in fact in many cases where the foam product is used, a vapor barrier may be omitted.

Foamed products upon curing containing from 5 to about 10 percent phenol achieve compressive strengths of approximately 10 to 15 lbs./in.$^3$, thus finding utilization in the form of boards. Their shear strength is also greatly increased. The products are particularly highly resistent to flame spread. At these percentages the product also may be formed into pipe coverings which have excellent thermal insulation properties.

Foamed products containing from about 10 percent to about 20 percent phenol by weight are very heavy, normally having desities between 1.6 and 3.5 lbs./in.$^3$. They may be used in place of styrene and urethane boards and are desirable because of their high resistance to flame. Such products are also much more water repellent than urea formaldehyde foams. At this range of phenol concentration, the use of additional foaming agent and increasing pressure allows one to foam the product without the need to add blowing agents.

Above these percentages of phenol, even with an increase in foaming agent and pressure, foaming by mechanical means is impossible or extremely difficult at ambient temperatures, which are the normal temperatures for application of these materials.

The resins of this invention are normally foamed at the site of use by using a portable applicator equipped with flexible hose for delivering expanded wet foam to areas to be insulated. Drying time depends on thickness, temperature, humidity, and the amount of ventilation. Under average summer conditions with normal attic ventilation, a 2" thick application will dry within 3 days. Winter temperatures do not affect the foaming process provided solution temperatures are kept above 50° F. during application.

Certain changes may be made in the compositions and processes herein described without departing from the scope and teachings and it is intended that all matter contained in the description is by way of illustration rather than limitation.

What is claimed is:

1. A composition for the preparation of foamed structures by frothing with a aqueous surfactant-hardener solution comprising a phenol-urea-formaldehyde condensation product in which the phenol is present in the amount of from about 1 to about 20 percent by weight, the urea is present in the amount of from about 23 to about 48 percent by weight and the formaldehyde is present in the amount of from about 42 to about 70 percent by weight, the ratio of formaldehyde to urea being in the range of from about 1 to about 3 parts formaldehyde to about 1 part urea, said condensation product having a viscosity at room temperature in the range of about 30 to about 36 seconds on a No. 1 Zahn cup and a pH maintained in the range of from about 6 to about 8.

2. The composition of claim 1 in which the phenol is present in the amount of about 2 percent by weight.

3. The composition of claim 1 in which the phenol is present in the amount of about 15 percent by weight.

* * * * *